(12) United States Patent
Li et al.

(10) Patent No.: US 9,454,030 B2
(45) Date of Patent: Sep. 27, 2016

(54) POLYMER DISPERSED LIQUID CRYSTAL FILM AND METHOD FOR MANUFACTURING THE SAME

(75) Inventors: Wenbo Li, Beijing (CN); Zhuo Zhang, Beijing (CN); Wang Hu, Beijing (CN); Chunyan Xie, Beijing (CN); Gang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 382 days.

(21) Appl. No.: 13/338,461

(22) Filed: Dec. 28, 2011

(65) Prior Publication Data

US 2012/0169987 A1     Jul. 5, 2012

(30) Foreign Application Priority Data

Dec. 31, 2010    (CN) .......................... 2010 1 0620017

(51) Int. Cl.
G02F 1/1333    (2006.01)
G02F 1/1334    (2006.01)
C09J 9/02      (2006.01)
C09K 19/54     (2006.01)
G02F 1/1341    (2006.01)

(52) U.S. Cl.
CPC ............... G02F 1/1334 (2013.01); C09J 9/02 (2013.01); C09K 19/544 (2013.01); C09K 2019/546 (2013.01); G02F 2001/13415 (2013.01)

(58) Field of Classification Search
None
See application file for complete search history.

(56) References Cited

U.S. PATENT DOCUMENTS 5,812,227 A      9/1998  Toshida et al.
6,049,366 A *    4/2000  Hakemi et al. ................. 349/86
6,504,592 B1 *   1/2003  Takatori et al. ............... 349/129
6,657,772 B2 *  12/2003  Loxley .......................... 359/296
7,535,624 B2 *   5/2009  Amundson et al. .......... 359/296
2009/0073351 A1* 3/2009  Kakinuma ............ G02F 1/1334 349/89
2010/0073605 A1* 3/2010  Masutani et al. ............... 349/86

FOREIGN PATENT DOCUMENTS

CN      101007949 A    8/2007
JP      06-167723 A    6/1994
JP      2001-004986 A  1/2001

OTHER PUBLICATIONS

First Chinese Office Action dated Oct. 21, 2013; Appln. No. 201010620017.9.
Second Chinese Office Action dated Mar. 21, 2014; Appln. No. 201010620017.9.

* cited by examiner

Primary Examiner — Jessica M Merlin
Assistant Examiner — Mark Teets
(74) Attorney, Agent, or Firm — Ladas & Parry LLP

(57) ABSTRACT

The disclosed technology involves a polymer dispersed liquid crystal film including: a first base substrate, a second base substrate, and a polymer dispersed liquid crystal film between the first base substrate and the second base substrate, wherein a first transparent conductive layer is formed on the first base substrate, the first transparent conductive layer is contacted with the first light permeable pressure-sensitive adhesive layer, and the polymer dispersed liquid crystal is adhered to the first base substrate through the first light permeable pressure-sensitive adhesive layer; and a second transparent conductive layer is formed on the second base substrate, the second transparent conductive layer is contacted with the second light permeable pressure-sensitive adhesive layer, and the polymer dispersed liquid crystal is adhered to the second base substrate through the second light permeable pressure-sensitive adhesive layer.

10 Claims, 2 Drawing Sheets

POLYMER DISPERSED LIQUID CRYSTAL FILM AND METHOD FOR MANUFACTURING THE SAME

BACKGROUND

Embodiments of the disclosed technology relates to a polymer dispersed liquid crystal film and a method for manufacturing the same.

A liquid crystal display with polymer dispersed liquid crystal (PDLC) film is a recently-developed flat display device capable of displaying information. PDLC film is a novel light-controlled film, which is formed by dispersing small molecular liquid crystals in a polymer matrix in the form of droplets and can exhibit two different optical state, transmission and scattering, under the effect of an external field (such as electric field, thermal field, etc.).

In a PDLC film, nematic liquid crystals are uniformly dispersed in a solid-state organic polymer matrix in micron scale. When no voltage is applied, each liquid droplet has its optical axis in a preferred orientation, i.e., the optical axes of all microparticles are in a state of disorder orientation. Because liquid crystal is a strongly anisotropic material optically and dielectrically, its effective refractive index is not matched with the refractive index of the matrix, in which case incident light may be strongly scattered, so that it exhibits an opaque or translucent opalescence. When an external electric field is applied, the orientation of the optical axes of the nematic liquid crystal molecules turns uniformly along the direction of the electric field. The ordinary refractive index of the liquid crystal microparticles reaches a certain extent of match with the refractive index of the matrix. Light can pass through the matrix, so that it exhibits a transparent or translucent state. When the external electric field is removed, the liquid crystal microparticles return to the initial state of light scattering. Therefore, the PDLC film possesses properties of an electrically controlled light switch under the effect of an electric field.

However, during the manufacture of PDLC films, it occurs often that ITO plastic films are in a state of disengagement or semi-disengagement because the cohesive force between the interposed PDLC film and the two ITO plastic films above and under the PDLC film is weak. In this way, when an electric field is applied to the PDLC film, many abnormal situations such as poor contact will occur, which brings huge difficulties to large-scale industrial manufacture. It not only lowers the displaying quality and performance of the product, but also severely affects the yield and economic benefit of the product.

SUMMARY

An embodiment of the disclosed technology provides a method for the manufacture of a polymer dispersed liquid crystal, comprising forming a first light permeable pressure-sensitive adhesive layer on a first base substrate on which a first transparent conductive layer has been formed, wherein the first transparent conductive layer is contacted with the first light permeable pressure-sensitive adhesive layer; forming a second light permeable pressure-sensitive adhesive layer on a second base substrate on which a second transparent conductive layer has been formed, wherein the second transparent conductive layer is contacted with the second light permeable pressure-sensitive adhesive layer; mixing liquid crystals, monomers capable of light polymerization, nanobeads and light initiators thoroughly to form a homogeneous mixture; coating the homogeneous mixture onto the first base substrate; assembling the first base substrate with the second base substrate to form a cell, so that the homogeneous mixture is provided between the first base substrate and the second base substrate, adheres to the first base substrate through the first light permeable pressure-sensitive adhesive layer, and adheres to the second base substrate through the second light permeable pressure-sensitive adhesive layer; and exposing the homogeneous mixture to ultraviolet light after the assembling, to form the polymer dispersed liquid crystal film.

Another embodiment of the disclosed technology provides a polymer dispersed liquid crystal film comprising: a first base substrate, a second base substrate, and a polymer dispersed liquid crystal film between the first base substrate and the second base substrate, wherein a first transparent conductive layer is formed on the first base substrate, the first transparent conductive layer is contacted with the first light permeable pressure-sensitive adhesive layer, and the polymer dispersed liquid crystal is adhered to the first base substrate through the first light permeable pressure-sensitive adhesive layer; and a second transparent conductive layer is formed on the second base substrate, the second transparent conductive layer is contacted with the second light permeable pressure-sensitive adhesive layer, and the polymer dispersed liquid crystal is adhered to the second base substrate through the second light permeable pressure-sensitive adhesive layer.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

The technical solutions in the examples of the disclosed technology will be clearly and fully described hereinafter in combination with the figures in the examples of the disclosed technology. It should be obvious that the described examples are merely some examples, rather than all exclusive examples of the disclosed technology. Based on the examples in the disclosed technology, any other examples that a skill artisan obtains without creative work falls into the scope of the disclosed technology.

Example 1

The method for the manufacture of a PDLC film provided in Example 1 of the disclosed technology comprises the following steps:

S101, forming a first light permeable pressure-sensitive adhesive layer on a first base substrate on which a first transparent conductive layer has been formed, wherein the first transparent conductive layer is contacted with the first light permeable pressure-sensitive adhesive layer;

S102, forming a second light permeable pressure-sensitive adhesive layer on a second base substrate on which a second transparent conductive layer has been formed, wherein the second transparent conductive layer is contacted with the second light permeable pressure-sensitive adhesive layer.

S103, mixing liquid crystals, monomers capable of light polymerization, nanobeads and light initiators thoroughly to form a homogeneous mixture.

S104, coating the homogeneous mixture onto the first base substrate.

S105, assembling the first base substrate with the second base substrate to form a cell, so that the homogeneous mixture is provided between the first base substrate and the second base substrate, adheres to the first base substrate through the first light permeable pressure-sensitive adhesive layer, and adheres to the second base substrate through the second light permeable pressure-sensitive adhesive layer.

S106. exposing the homogeneous mixture to ultraviolet light after the assembling to form a PDLC film.

The method for the manufacture of a PDLC film provided in Example 1 of the disclosed technology allows the interposed PDLC film layer to adhere to the two base substrates above and under it through light permeable pressure-sensitive adhesives so as to effectively prevent the disengagement or semi-disengagement from the base substrates, which occurs in the related art due to weak cohesive force. This not only increases the display quality and performance of the product, but also increases the yield and the economic benefit of the product. Moreover, in the example of the disclosed technology, increasing the cohesive force of the PDLC does not need to be accomplished by adjusting the components and ratio thereof in the original PDLC, so that the original electrooptic properties of the PDLC can be ensured.

Example 2

Figure 1:
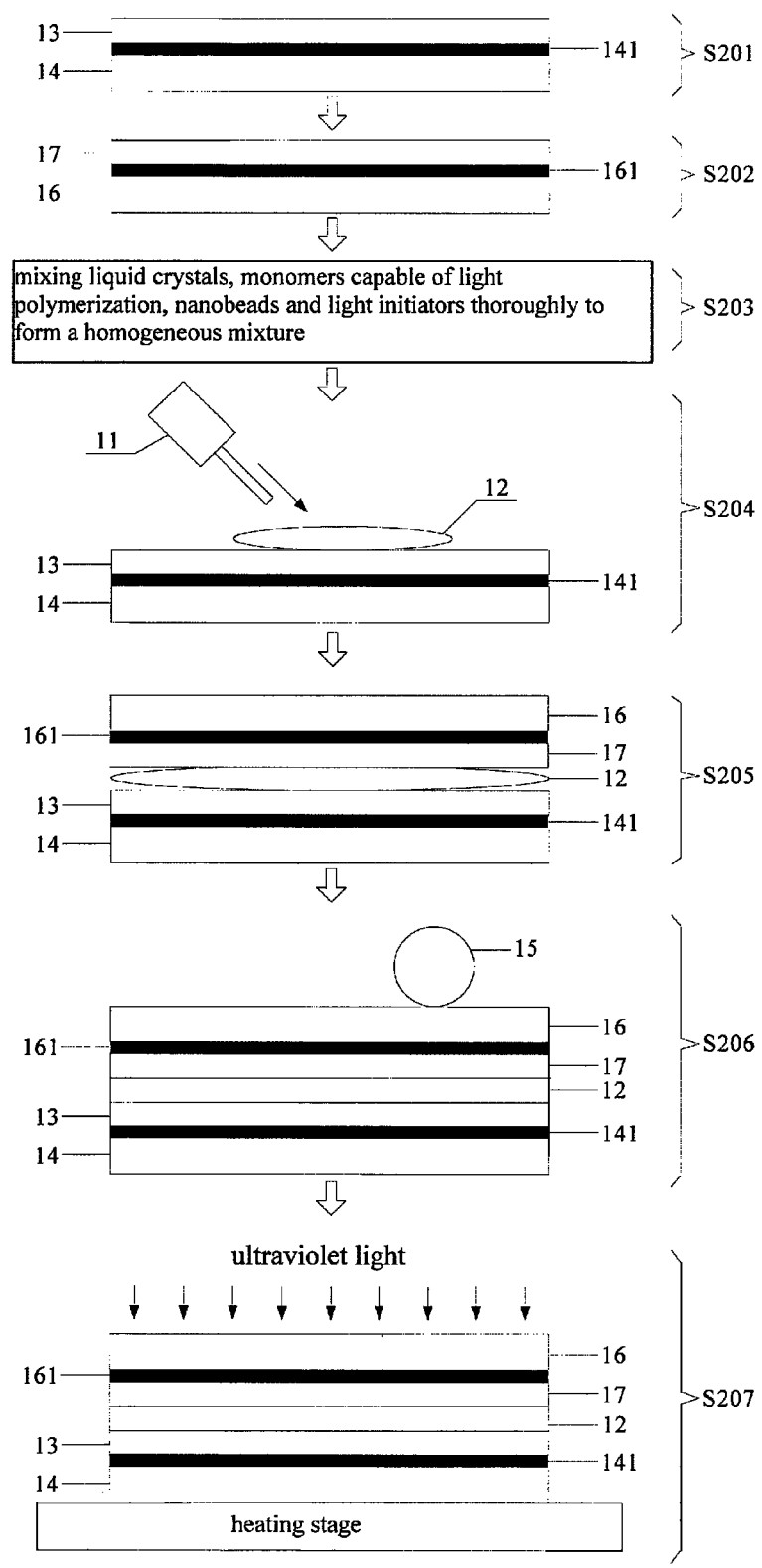
FIG. 1 is a flow chart illustrating the method for the manufacture of the PDLC film provided in Example 2 of the disclosed technology.

The method for the manufacture of a PDLC film provided in Example 2 of the disclosed technology, as shown in FIG. 1, comprises the following steps.

S201, forming a first light permeable pressure-sensitive adhesive layer 13 on a first base substrate 14 on which a first transparent conductive layer 141 has been formed, wherein the first transparent conductive layer 141 is contacted with the first light permeable pressure-sensitive adhesive layer 13. In this example, the first base substrate 14 may be a flexible base substrate.

S202, forming a second light permeable pressure-sensitive adhesive layer 17 on a second base substrate 16 on which a second transparent conductive layer 161 has been formed, wherein the second transparent conductive layer 161 is contacted with the second light permeable pressure-sensitive adhesive layer 17. In this example, the second base substrate 16 may be a flexible base substrate also.

The first base substrate on which the first transparent conductive layer has been formed in step S201 and the second base substrate on which the second transparent conductive layer has been formed in step S202 may be PET (polyethylene terephthalate) plastic flexible base substrates each formed with an ITO (indium tin oxides) layer.

The procedure of forming the first light permeable pressure-sensitive adhesive layer on the first base substrate in step S201 and forming the second light permeable pressure-sensitive adhesive layer on the second base substrate in step S202 can, e.g., be conducted as follows:

1) peeling of the surface membrane on a side of the light permeable pressure-sensitive adhesive, and adhering it to the PET plastic base substrate whose surface is formed with an ITO layer with a filming machine; and 2) peeling of the surface membrane on the opposite side of the light permeable pressure-sensitive adhesive to expose the adhesive layer.

By this procedure, the first light permeable pressure-sensitive adhesive layer is formed on the first base substrate, and the second light permeable pressure-sensitive adhesive layer can be formed on the second base substrate also.

In this example, the first and second light permeable pressure-sensitive adhesive layer satisfy one or more of the following parameters:

the adhesion of the first and second light permeable pressure-sensitive adhesive layer can be 8~10×10$^3$ mN/25 mm;

the volume resistivity of the first and second light permeable pressure-sensitive adhesive layer can be more than or equal to 10$^9$ Ω·cm and less than or equal to 10$^{11}$ Ω·cm;

the transmittance of the first and second light permeable pressure-sensitive adhesive layer can be more than or equal to 90%; and the thickness of the first and second light permeable pressure-sensitive adhesive layer can be 20~80 μm.

Moreover, the first and second light permeable pressure-sensitive adhesive layer can be selected from conductively isotropic or anisotropic pressure-sensitive adhesives according to needs.

For example, if the PDLC film is used on electronically-controlled intelligent glass or simple 7-segment display device, a conductively isotropic light permeable pressure-sensitive adhesive can be selected for the first light permeable pressure-sensitive adhesive layer and the second light permeable pressure-sensitive adhesive layer; that is, the free electrons or holes within the pressure-sensitive adhesive can move in all directions, and the transverse direction of the pressure-sensitive adhesive (parallel to the surface direction of the PDLC film) can also be conductive. In this case, the first transparent conductive layer (ITO layer) is an integrated conductive layer, and the second transparent conductive layer (ITO layer) is also an integrated conductive layer. This can ensure rapid response of the electronically-controlled intelligent glass under the electric field.

If the PDLC film is used on a matrix display device, a conductively anisotropic light permeable pressure-sensitive adhesive can be selected for the first light permeable pressure-sensitive adhesive layer and the second light permeable pressure-sensitive adhesive layer so that the pressure-sensitive adhesive is conductive in the direction perpendicular to the base substrates above and under it, i.e., the free electrons and holes within the pressure-sensitive adhesive can move in the perpendicular direction, but not conductive in the transverse direction. In this case, the first transparent conductive layer (ITO layer) is an integrated conductive layer, an array of thin film transistors is formed on the second base substrate, the second transparent conductive layer (ITO layer) comprises one or more conductive patterns, and each conductive pattern is controlled by a thin film transistor. This can avoid the crosstalk between pixels so as to ensure the display quality.

It should be understood that the conductively isotropic or anisotropic pressure-sensitive adhesives selected above are neither ideal conductors nor ideal insulators. Preferably, the conductively isotropic or anisotropic pressure-sensitive adhesives have high resistivity. In examples of the disclosed technology, the pressure-sensitive adhesives sandwiching the PDLC membrane can serve as capacitive dividers. The PDLC membrane, together with the pressure-sensitive adhesives sandwiching it, corresponds to a series connection of three capacitors.

S203, mixing liquid crystals, monomers capable of light polymerization, nanobeads and light initiators thoroughly to form a homogeneous mixture 12.

In this example, the homogeneous mixture satisfies one or more of the following parameters:

the ratio of the monomers capable of light polymerization to the liquid crystals can be 1:3 by mass;

the content of the initiator can be 1~30% of the mass of the monomers capable of light polymerization;

the content of nanobeads can be 1~10% of the sum of the mass of the liquid crystals and the monomers capable of light polymerization;

Examples of the monomers capable of light polymerization may include: lauryl acrylate, 1,6-hexanediol diacrylate, poly(ethylene glycol) acrylate and isobornyl acrylate.

The ratio of lauryl acrylate, 1,6-hexanediol diacrylate, poly(ethylene glycol) acrylate and isobornyl acrylate can be 60:20:10:10 by mass.

Among these, lauryl acrylate (LA) is a monofunctional monomer capable of light polymerization having a long alkyl chain, and using it as a monomer diluent can effectively reduce the driving voltage of the PDLC film and enhance the flexibility of the PDLC film;

1,6-hexanediol diacrylate (HDDA) can significantly increase the polymerization rate of the PDLC film, control the density of the polymer network after polymerization, and improve the contrast of the PDLC film;

Poly(ethylene glycol) acrylate (PEG400) is a water-soluble monomer with low irritation to skin, which can form flexible cure film through free radical curing;

Isobornyl acrylate (IBOA), due to its unique bicycloalkyl structure, forms polymers having high glass-transition temperature (88° C.) through free radical polymerization, which is an excellent monomer material capable of light polymerization required for the preparation of PDLC with high glass-transition temperature, and can enhance thermal stability of complex materials.

S204, coating the homogeneous mixture 12 on the first light permeable pressure-sensitive adhesive layer 13 of the first base substrate 14 with a syringe 11.

S205, assembling the first base substrate 14 with the second base substrate 16 to form a cell, so that the homogeneous mixture 12 is provided between the first base substrate 14 and the second base substrate 16, adheres to the first base substrate 14 through the first light permeable pressure-sensitive adhesive layer 13, and adheres to the second base substrate 16 through the second light permeable pressure-sensitive adhesive layer 17.

S206, pressing uniformly the assembled first base substrate 14 and second base substrate 16 with a roller 15.

S207, exposing the first base substrate 14 and the second base substrate 16 that are assembled together and pressed to uniform to a certain intensity of ultraviolet light for certain time under certain preparative temperature to obtain the PDLC film.

For example, it can be exposed to ultraviolet light of 365 nm (intensity of the ultraviolet light is 20 mW/cm$^2$) under room temperature for 10 minutes to obtain the PDLC film.

The method for the manufacture of a PDLC film provided in Example 2 of the disclosed technology allows the interposed PDLC film layer to adhere to the two base substrates above and under it through light permeable pressure-sensitive adhesives so as to effectively prevent the disengagement or semi-disengagement from the base substrates which occurs in the related art due to weak cohesive force. This not only increases the display quality and performance of the product, but also increases the yield and the economic benefit of the product. Moreover, in examples of the disclosed technology, increasing the cohesive force of PDLC does not need to be accomplished by adjusting the components and ratio thereof in the original PDLC, so that the original electrooptic properties of the PDLC can be ensured.

Example 3

Figure 2:
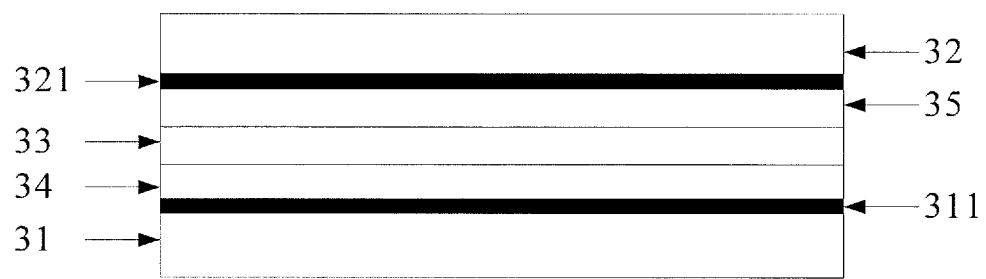
FIG. 2 is a diagram illustrating the PDLC film provided in Example 3 of the disclosed technology.

The PDLC film 30 provided in Example 3 of the disclosed technology, as shown in FIG. 2, comprises the first base substrate 31 and the second base substrate 32, as well as the PDLC film 33 interposed between the first base substrate 31 and the second base substrate 32. A first transparent conductive layer 311 is formed on the first base substrate 31, and the first transparent conductive layer 311 is contacted with the first light permeable pressure-sensitive adhesive layer 34, and the PDLC film 33 is adhered to the first base substrate 31 through the first light permeable pressure-sensitive adhesive layer 34; a second transparent conductive layer 321 is formed on the second base substrate 32, and the second transparent conductive layer 321 is contacted with the second light permeable pressure-sensitive adhesive layer 35, and the PDLC film 33 is adhered to the second base substrate 32 through the second light permeable pressure-sensitive adhesive layer 35.

The PDLC film provided in Example 3 of the disclosed technology allows the interposed PDLC film layer to adhere to the two base substrates above and under it through light permeable pressure-sensitive adhesives so as to effectively prevent the disengagement or semi-disengagement from the base substrates which occurs in the related art due to weak cohesive force. This not only increases the display quality and performance of the product, but also increases the yield and the economic benefit of the product.

In this example, the first and the second base substrate are flexible base substrates, and may be PET plastic flexible base substrates formed with an ITO layer.

The first and second light permeable pressure-sensitive adhesive layer satisfy one or more of the following parameters:

the adhesion of the first and second light permeable pressure-sensitive adhesive layer can be 8~10×10$^3$ mN/25 mm;

the volume resistivity of the first and second light permeable pressure-sensitive adhesive layer can be more than or equal to 10$^9$ Ω·cm and less than or equal to 10$^{11}$ Ω·cm;

the transmittance of the first and second light permeable pressure-sensitive adhesive layer can be more than or equal to 90%;

the thickness of the first and second light permeable pressure-sensitive adhesive layer can be 20~80 μm.

Moreover, the first light permeable pressure-sensitive adhesive layer and the second light permeable pressure-sensitive adhesive layer can be selected from conductively isotropic or anisotropic pressure-sensitive adhesives according to needs.

For example, if the PDLC film is used on electronically-controlled intelligent glass or simple 7-segment display device, a conductively isotropic light permeable pressure-sensitive adhesive can be selected for the first light permeable pressure-sensitive adhesive layer and the second light permeable pressure-sensitive adhesive layer; and the transverse direction of the pressure-sensitive adhesive can also be conductive. In this case, the first transparent conductive layer (ITO layer) is an integrated conductive layer, and the second transparent conductive layer (ITO layer) is also an integrated conductive layer. This can ensure rapid response of the electronically-controlled intelligent glass under the electric field.

If the PDLC film is used on a matrix display device, a conductively anisotropic light permeable pressure-sensitive adhesive can be selected for the first light permeable pressure-sensitive adhesive layer and the second light permeable pressure-sensitive adhesive layer so that the pressure-sensitive adhesive is conductive in the directly perpendicular to the base substrates above and under it, but not conductive in the transverse direction. In this case, the first transparent conductive layer (ITO layer) is an integrated conductive layer, an array of thin film transistors is formed on the second base substrate, the second transparent conductive layer (ITO layer) comprises one or more conductive patterns, and each conductive pattern is controlled by a thin film transistor. This can avoid the crosstalk between pixels so as to ensure the display quality.

The embodiment of the disclosed technology being thus described, it will be obvious that the same may be varied in many ways. Such variations are not to be regarded as a departure from the spirit and scope of the disclosed technology, and all such modifications as would be obvious to those skilled in the art are intended to be included within the scope of the following claims.

What is claimed is:

1. A method for the manufacture of a polymer dispersed liquid crystal display, comprising:
    forming a first light permeable pressure-sensitive adhesive layer on a first base substrate on which a first transparent conductive layer has been formed, wherein the first transparent conductive layer is contacted with the first light permeable pressure-sensitive adhesive layer;
    forming a second light permeable pressure-sensitive adhesive layer on a second base substrate on which a second transparent conductive layer has been formed, wherein the second transparent conductive layer is contacted with the second light permeable pressure-sensitive adhesive layer;
    mixing liquid crystals, monomers capable of light polymerization, nanobeads and light initiators thoroughly to form a homogeneous mixture;
    coating the homogeneous mixture onto the first base substrate;
    assembling the first base substrate with the second base substrate to form a cell, so that the homogeneous mixture is provided between the first base substrate and the second base substrate by adhering to the first base substrate through the first light permeable pressure-sensitive adhesive layer and adhering to the second base substrate through the second light permeable pressure-sensitive adhesive layer simultaneously in a single step; and
    exposing the homogeneous mixture to ultraviolet light after the assembling to form the polymer dispersed liquid crystal film,
    wherein the first light permeable pressure-sensitive adhesive layer and the second light permeable pressure-sensitive adhesive layer are a conductively anisotropic light permeable pressure-sensitive adhesive so that the pressure-sensitive adhesive is conductive in a direction perpendicular to the base substrate but not conductive in a direction transverse to the base substrate, transmittance of the first light permeable pressure-sensitive adhesive layer or the second light permeable pressure-sensitive adhesive layer is more than or equal to 90%.

2. The method according to claim 1, wherein adhesion of the first light permeable pressure-sensitive adhesive layer or the second light permeable pressure-sensitive adhesive layer is 8~10 ×10$^3$mN/25 mm.

3. The method according to claim 1, wherein volume resistivity of the first light permeable pressure-sensitive adhesive layer or the second light permeable pressure-sensitive adhesive layer is more e than or equal to $10^9$ Ω·cm and less than or equal to $10^{11}$ Ω·cm.

4. The method according to claim 1, wherein a thickness of the first light permeable pressure-sensitive adhesive layer or the second light permeable pressure-sensitive adhesive layer is 20~80μm.

5. The method according to Claim wherein a ratio of the monomers capable of light polymerization to the liquid crystals is 1:3 by mass.

6. The method according to claim 1, wherein a content of the initiator is 1~30% of the mass of the monomers capable of light polymerization.

7. The method according to claim 1, wherein a content of nanobeads is 1~10% of the sum of the mass of the liquid crystals and the monomers capable of light polymerization.

8. The method according to claim 1, wherein the monomers capable of light polymerization include lauryl acrylate, 1,6-hexanediol diacrylate, poly(ethylene glycol) acrylate and isobornyl acrylate.

9. The method according to claim 8, wherein the ratio of lauryl acrylate, 1,6-hexanediol diacrylate, poly(ethylene glycol) acrylate and isobornyl acrylate is 60:20:10:10 by mass.

10. The method according to claim 1, wherein the first base substrate and the second base substrate are flexible base substrates;
    after the first base substrate is assembled together with the second base substrate, and before the aligned homogeneous mixture is exposed to ultraviolet light, the method further comprises:
    pressing the aligned first base substrate and the second base substrate to uniform with a roller.

* * * * *

UNITED STATES PATENT AND TRADEMARK OFFICE
CERTIFICATE OF CORRECTION

PATENT NO.          : 9,454,030 B2
APPLICATION NO.     : 13/338461
DATED               : September 27, 2016
INVENTOR(S)         : Li et al.

It is certified that error appears in the above-identified patent and that said Letters Patent is hereby corrected as shown below:

In the Claims

Column 8, Claim 5 - delete "Claim wherein" and insert --Claim 1, wherein--.

Signed and Sealed this
Twenty-fifth Day of April, 2017

Michelle K. Lee
*Director of the United States Patent and Trademark Office*